W. F. LINDSEY.
PLOW.
APPLICATION FILED JULY 10, 1908.
975,544.
Patented Nov. 15, 1910.
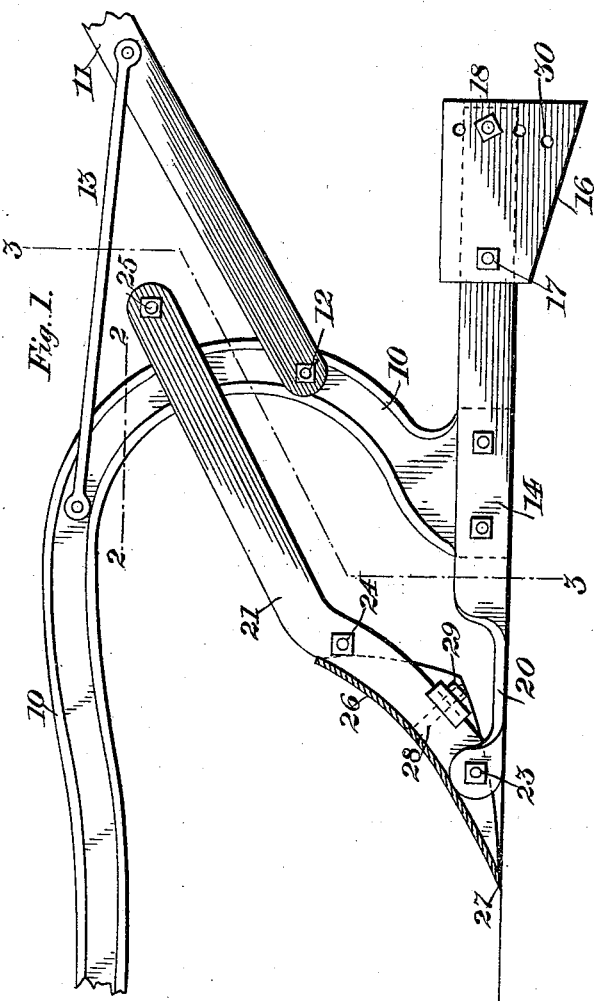
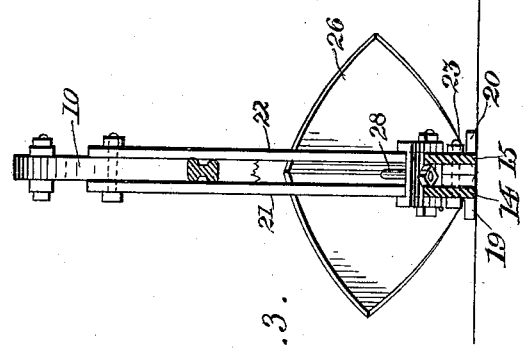
Witnesses
J. C. Brecht
C. N. Woodward
Inventor
William F. Lindsey,
By 
Attorneys

UNITED STATES PATENT OFFICE.

WILLIAM F. LINDSEY, OF SADLER, TEXAS.

PLOW.

975,544.  Specification of Letters Patent.  Patented Nov. 15, 1910.

Application filed July 10, 1908. Serial No. 442,914.

*To all whom it may concern:*

Be it known that I, WILLIAM F. LINDSEY, a citizen of the United States, residing at Sadler, in the county of Grayson, State of Texas, have invented certain new and useful Improvements in Plows; and I do hereby declare the following to be a full, clear, and exact description of the invention, such as will enable others skilled in the art to which it appertains to make and use the same.

This invention relates to plows, more particularly to shovel plows, and has for its object to simplify and improve the construction and increase the efficiency and utility of devices of this character.

With these and other objects in view the invention consists in certain novel features of construction as hereafter shown and described and then specifically pointed out in the claim, and in the drawings illustrating the preferred embodiment of the invention.

Figure 1 is a side elevation of the improved plow. Fig. 2 is a plan view in section on the line 2—2 of Fig. 1 with the handles removed. Fig. 3 is a section on the line 3—3 of Fig. 1 with the handles and braces removed.

The improved device comprises a beam 10 of the usual construction and preferably of steel, with handles 11 connected thereto at 12 and with braces 13 between the handles and the beam. Attached to the opposite sides of the beam at its lower or foot portion are two runners 14—15 spaced apart a distance equal to the thickness of the beam and extending both forwardly and rearwardly thereof. At the rear end of the runners a cutter element 16 is mounted to swing upon a pivot 17 near its forward end, the rear end of the cutter being provided with a plurality of apertures 30 to receive a clamp bolt 18 extending through the runners so that the cutter element may be adjusted vertically to increase or decrease the depth of the cut, as hereafter more fully explained.

The forward ends of the runners are formed with upstanding transversely perforated ears 15, to receive a bolt 23 by which the runners are connected with the standard, presently to be described. Back of the ears the runners are laterally deflected to provide the shoes 19 and 20 that operate to cause the mold board to cut to a determined depth. As will be seen by reference to Fig. 1 the shoes wedge into the ears on curved lines, and this will materially facilitate the passage of the mold board through the soil, as there will be no abrupt surfaces against which the earth can pack. Pivotally connected to the forward ends of the runners by the bolt 23 is the standard, which as shown in Fig. 2 is composed of two space bars 21 and 22, the forward ends of which are inset to fit between the ears 15×.

The standard members are curved rearwardly and upwardly and thence extended obliquely rearwardly of the beam 10 and bear against the side faces thereof, and are provided with transverse apertures forwardly and rearwardly of the beam, the apertures being designed to receive clamp bolts 24—25 by which the standard members may be adjustably clamped to the beam. By this arrangement it will be obvious that by loosening the bolts 24—25 the standard may be adjusted to any required extent upon the beam.

Bearing upon the standard members 21—22 is the mold-board 26 having its nose 27 extending forwardly of the forward ends of the runners. Extending through the mold-board near its lower end is a clamp bolt 28, the head of the bolt fitting into a countersunk cavity in the face of the mold-board and the opposite end provided with a nut 29, the latter bearing against the under sides of the standard members 21—22 and fitting into the recesses formed by the offsets 19—20 of the runners, the recess formed by the lateral portions 19—20 adapted to receive the nut 29 and enable a wrench to be applied thereto when required. By this simple means the mold-board may be readily attached and detached for sharpening or for renewal and may be likewise adjusted upon the standard, while the standard itself may be adjusted to change the inclination of the mold-board and thus control the depth of the cut.

The cutter member 16 may be adjusted to operate at any depth below the runners, to adapt it to the condition of the soil through which the plow is operating, and controls and steadies the plow, and prevents lateral movement or wabbling.

It will be observed upon reference to the drawings that the shoes 19 and 20 are below and slightly in the rear of the plow and serve to bear in the bottom of the furrow and resist any tendency of the plow to run lower in the soil and aid materially in keeping the runner bars level and maintaining the point of the plow at a required depth in the soil. The cutter 16 which enters vertically into and below the bottom of the furrow serves to direct the plow in a straight line and prevents wabbling thereof. It will be further observed that in order to guide the plow when working a soft or loamy soil, it is necessary that the edge of the cutter project deeper to prevent lateral movement than would be the case if the plow were operating in a clay or any soil difficult to work and the adjustable nature of the cutter heretofore described attains this end.

The device is simple in construction, can be inexpensively manufactured, and operates satisfactorily for the purposes described.

What is claimed, is:—

In a plow, the combination with a beam, of runners provided at their forward ends with upstanding transversely perforated ears; a pair of outwardly and downwardly extending shoe members formed integral with said runners adjacent said ears for presenting an enlarged horizontal surface to the soil; a pair of cutters pivoted to the rear ends of said runners; and means for adjusting said cutters so that their cutting edges may be projected downwardly to a greater or less extent.

In testimony whereof, I affix my signature, in presence of two witnesses.

WILLIAM F. LINDSEY.

Witnesses:
A. T. HIGHTOWER,
H. ELDREDGE.